A. KETRING.
PULVERIZER.
APPLICATION FILED DEC. 3, 1912.
1,080,010.
Patented Dec. 2, 1913.
2 SHEETS—SHEET 1.
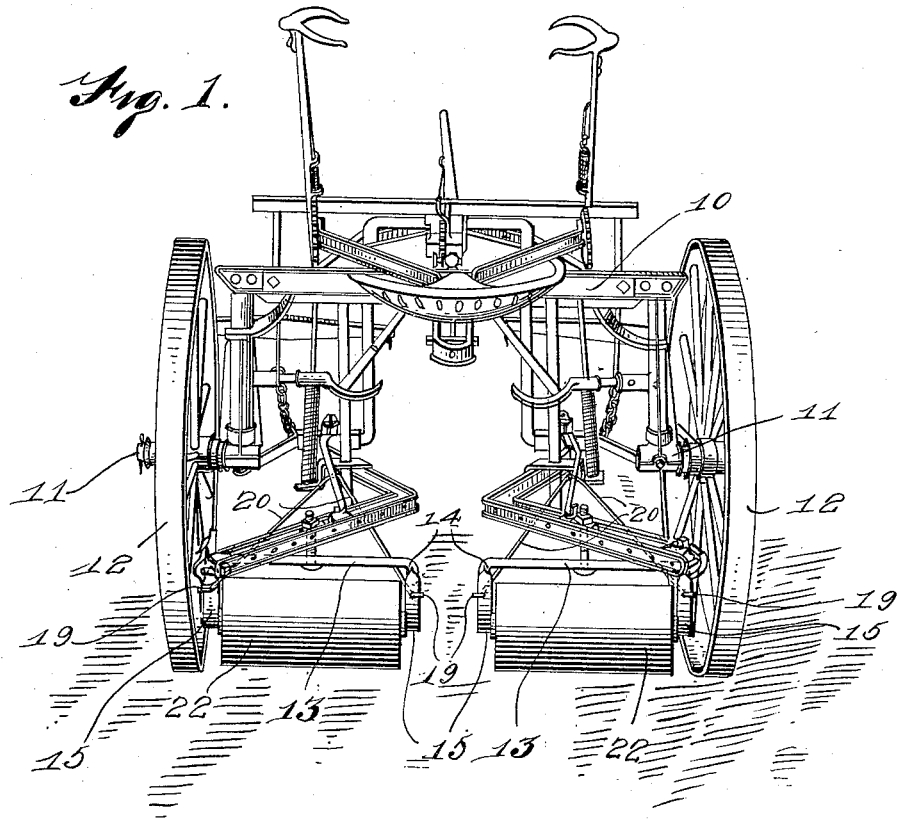
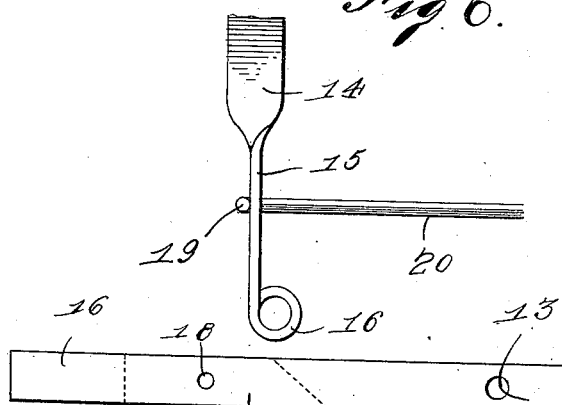
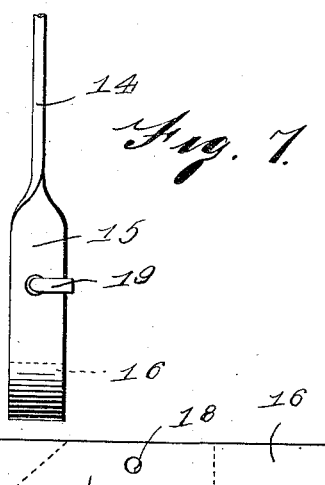

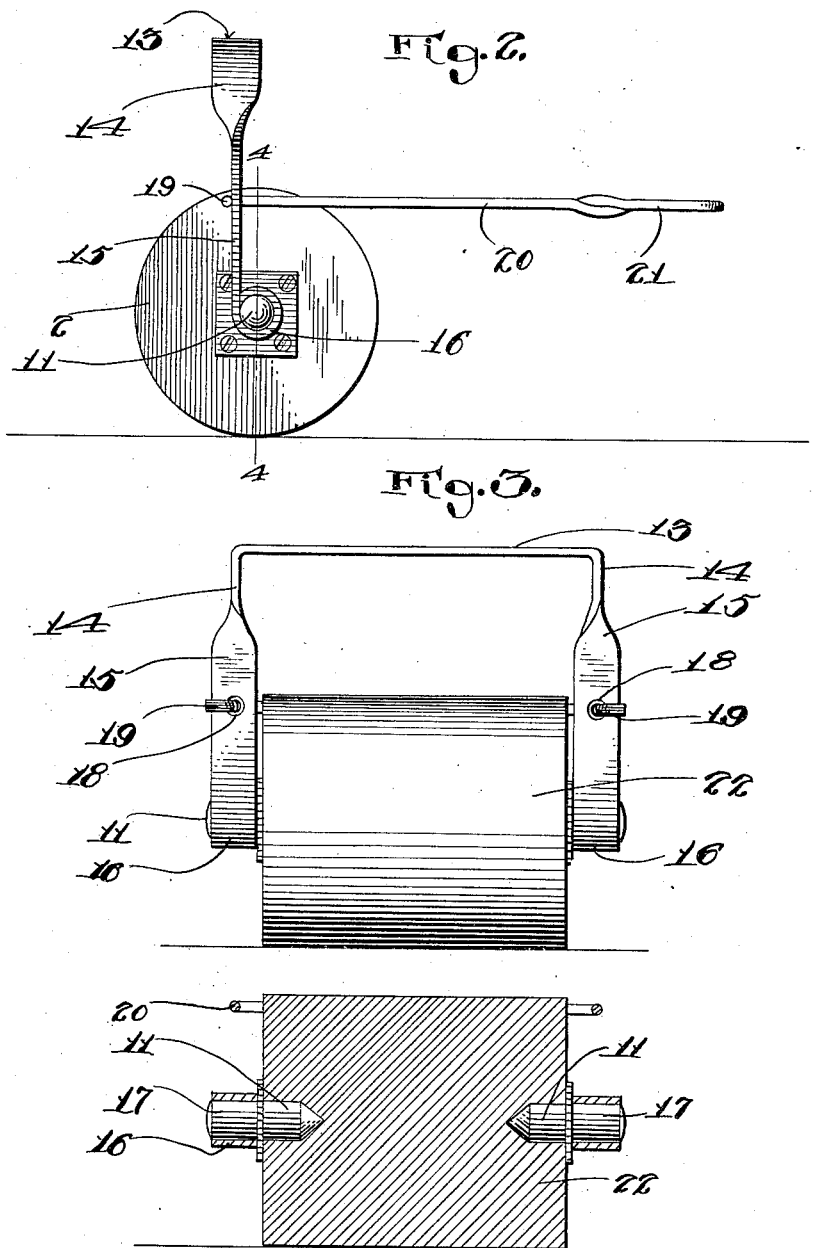

UNITED STATES PATENT OFFICE.

ADDISON KETRING, OF NEW MADISON, OHIO.

PULVERIZER.

1,080,010.   Specification of Letters Patent.   Patented Dec. 2, 1913.

Application filed December 3, 1912. Serial No. 734,744.

*To all whom it may concern:*

Be it known that I, ADDISON KETRING, a citizen of the United States, residing at New Madison, in the county of Darke and State of Ohio, have invented certain new and useful Improvements in Pulverizers, of which the following is a specification, reference being had therein to the accompanying drawing.

This invention relates to agricultural implements and has special reference to an attachment to cultivators for pulverizing the soil after the same has been operated upon by the cultivator.

The principal object of the invention is to improve and simplify the general construction of devices of this character.

With the above and other objects in view as will be hereinafter apparent, the invention consists in general, of certain novel features of construction and combinations of parts hereinafter fully described, illustrated in the accompanying drawings, and specifically claimed.

In the accompanying drawings, like characters of reference indicate like parts in the several views and Figure 1 is a rear view of a cultivator having the attachment applied thereto. Fig. 2 is a side view of the attachment as ready to be applied to a cultivator. Fig. 3 is a rear view thereof. Fig. 4 is a section on the line 4—4 of Fig. 2. Fig. 5 is a detail view of the supporting strap used herewith. Fig. 6 is a side elevation of said strap showing one leg in its folded position. Fig. 7 is an end view of the said leg as illustrated in Fig. 6.

In the present construction of the invention there is provided a frame which is indicated generally at 10. This frame is supported on an axle comprising a number of stub axles 11 which support wheels 12, whereon the frame rests when driven over the ground. The ordinary cultivator mechanism is employed and to the rear of the frame 10 is attached a supporting member which consists of a single strap of bar material of uniform width and thickness throughout which is so bent and twisted as to provide a flat bight portion 13 from whence extend depending portions 14 bent at right angles to the bight portion and then twisted at right angles to provide the supporting portions 15 which have their terminal ends convoluted as at 16 to constitute journal bearings for the journals 17 of the stub shafts 11. Each of the portions 15 is provided with an opening 18 wherein is held the hook end 19 of a rod 20 which is twisted to provide an eye 21 arranged to be attached to the gang frame of the machine.

In the construction of this device it will be observed that the same may be applied to any straddle row cultivator so that the rollers indicated at 22, and which are mounted on the stub shafts 11, pulverize the material which has been turned up by the plows or other earth working tools of the cultivator. It will be clearly understood that when the material passes from the plows of the cultivator the rollers 22 will serve to pulverize the same and reduce it to a fine powder. Thus, the fertilization of the soil will be fully accomplished.

There has thus been provided a simple and efficient device of the kind described and of the character specified.

Having thus described the invention, what is claimed is:—

In the device of the kind described, the combination with a roller arranged for pulverizing the soil, of a frame therefor comprising a single strip of material of uniform width and thickness, said material being provided centrally with a bolt receiving opening and having fold lines equally spaced on opposite sides of said opening and arranged diagonally to the length of the material, said material further having terminal portions defined therefrom by fold lines arranged to be folded into bearing members, said material further being provided with bars receiving openings intermediate the diagonal fold lines and those last mentioned.

In testimony whereof I hereunto affix my signature in presence of two witnesses.

ADDISON KETRING.

Witnesses:
E. N. SLOYS,
O. E. KETRING.

---

Copies of this patent may be obtained for five cents each, by addressing the "Commissioner of Patents, Washington, D. C."